United States Patent
Cho et al.

(10) Patent No.: US 8,784,657 B2
(45) Date of Patent: Jul. 22, 2014

(54) PLASMA DISCHARGE SELF-CLEANING FILTRATION SYSTEM

(75) Inventors: Young I. Cho, Cherry Hill, NJ (US); Alexander Fridman, Marlton, NJ (US); Alexander F. Gutsol, San Ramon, CA (US); Yong Yang, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 1165 days.

(21) Appl. No.: 12/672,005

(22) PCT Filed: Aug. 7, 2008

(86) PCT No.: PCT/US2008/072502
§ 371 (c)(1),
(2), (4) Date: May 18, 2010

(87) PCT Pub. No.: WO2009/048682
PCT Pub. Date: Apr. 16, 2009

(65) Prior Publication Data
US 2011/0266209 A1    Nov. 3, 2011

Related U.S. Application Data

(60) Provisional application No. 60/954,479, filed on Aug. 7, 2007.

(51) Int. Cl.
*B01D 24/46* (2006.01)
*B01D 25/32* (2006.01)
*B01D 24/00* (2006.01)

(52) U.S. Cl.
USPC .......... 210/269; 210/748.01; 210/748.05; 210/774; 210/153; 210/243; 422/22; 422/127; 422/186.04; 422/186.21; 422/243; 204/155; 204/164; 204/554; 204/571; 204/193

(58) Field of Classification Search
USPC .......... 210/748.01, 748.02, 748.05, 767, 774, 210/775, 780, 785, 153, 172.1, 172.2, 243, 210/263, 348, 353, 354, 407, 409, 636, 210/321.69, 791; 204/155, 156, 157.15, 204/164, 554, 571, 193, 194, 232, 240, 276, 204/280; 422/22, 127, 186.04, 186.05, 422/186.1, 186.21, 608, 616, 243, 292
See application file for complete search history.

(56) References Cited

U.S. PATENT DOCUMENTS 4,541,848 A * 9/1985 Masuda ..................... 96/54
6,238,629 B1 * 5/2001 Barankova et al. ...... 422/186.04
(Continued)

FOREIGN PATENT DOCUMENTS

KR    10-1999-83744 A    12/1999
KR    10-2000-63103 A    11/2000

OTHER PUBLICATIONS

PCT Application No. PCT/US2008/072502 : International Search Report and Written Opinion of the International Searching Authority, Aug. 13, 2009, 13 pages.

*Primary Examiner* — Walter D Griffin
*Assistant Examiner* — Cameron J Allen
(74) *Attorney, Agent, or Firm* — Baker & Hostetler LLP

(57) ABSTRACT

The present invention is directed to a novel method for cleaning a filter surface using a plasma discharge self-cleaning filtration system. The method involves utilizing plasma discharges to induce short electric pulses of nanoseconds duration at high voltages. These electrical pulses generate strong Shockwaves that disintegrate and dislodge particulate matter located on the surface of the filter.

25 Claims, 9 Drawing Sheets

(56) References Cited

U.S. PATENT DOCUMENTS

| | | | |
|---|---|---|---|
| 6,660,061 B2 * | 12/2003 | Josephson et al. | 95/2 |
| 7,341,616 B2 * | 3/2008 | Taylor et al. | 95/70 |
| 7,947,110 B2 * | 5/2011 | Taylor | 95/2 |
| 8,012,359 B2 * | 9/2011 | Parkinson | 210/786 |
| 2002/0023419 A1 | 2/2002 | Penth et al. | |
| 2002/0027107 A1 * | 3/2002 | Andreev | 210/748 |
| 2003/0079982 A1 * | 5/2003 | Josephson et al. | 204/164 |
| 2005/0229564 A1 * | 10/2005 | Okubo et al. | 55/523 |
| 2007/0183944 A1 * | 8/2007 | Shawcross | 422/186.04 |
| 2007/0251816 A1 * | 11/2007 | Welty | 204/192.38 |

\* cited by examiner

PLASMA DISCHARGE SELF-CLEANING FILTRATION SYSTEM

CROSS-REFERENCE TO RELATED APPLICATIONS

This application is the National Stage of International Application No. PCT/US2008/072502 filed Aug. 7, 2008, which claims the benefit of U.S. Provisional Application No. 60/954,479, filed Aug. 7, 2007, the disclosures of which are incorporated herein by reference in their entirety.

STATEMENT OF GOVERNMENT INTEREST

The subject matter of the present application was reduced to practice with Government support under Grant No. DE-FC26-06NT42724 awarded by the Department of Energy; the Government is therefore entitled to certain rights to this subject matter.

TECHNICAL FIELD

The present invention relates to plasma systems, and in particular, to the use of plasma for a self-cleaning filtration system.

BACKGROUND

Filtration is a process of removing contaminants from a stream of either gas or liquid. Most liquid filtration methods use a pump located beneath a tank to feed a liquid, such as water, through tubular filters or bag filters before passing into a liquid reservoir. With continued use, the filter will slowly accumulate unwanted solids, resulting in a decrease in the flow rate due to the increased pressure drop caused by the accumulated solids on the surface of the filter.

When the filter surface is significantly clogged, causing a significant reduction in fluid-flow, the filter should be either cleaned or replaced. Such a maintenance procedure, however, can be costly. During the procedure, the filtration system must be stopped, resulting in lost production. Additionally, the maintenance costs for labor and replacement filters are typically expensive.

Most traditional self-cleaning filters use a backwash method, which reverses the direction of water flow during the cleaning phase. The backward flow dislodges deposits on the filter surface and removes the contaminants from the filter system. One of the drawbacks of this backwash method is the consequential waste of clean water used to clean the filters. Additionally, suitable piping arrangements can become unnecessarily complicated in order to accommodate the backwash flow. A backwash concept may not be practical for numerous filtration systems such as plants which utilize high flow rates in light of the need for large pipe diameters and large quantities of clean water for the backwash to be effective.

SUMMARY

The present invention is directed to cleaning a filter surface using a plasma discharge generated in a filter apparatus. The filter apparatus has chamber with a filter mesh. The apparatus also has an inlet for unfiltered liquid, one outlet for filtered liquid and a second outlet for filtered particles. An electrode is placed in a position proximate to the filter mesh. A potential of short duration is applied to the electrode, causing a plasma discharge. The plasma discharge induces electric pulses, preferably of duration in the nanosecond time scale, at high voltages. The electric pulses vaporize a portion of the water surrounding the electrode generating shock waves that act upon, such as disintegrating or dislodging, the particles collected on the filter mesh. The dislodged or disintegrated particles travel out of the apparatus through the particle outlet stream.

In one embodiment, a method of cleaning a filtration system is disclosed. An electric potential is applied to an electrode resulting in a plasma discharge. The plasma discharge induces an electric pulse at a high voltage. The electric pulse vaporizes a portion of water generating a shockwave. The shockwave travels to a filter mesh, thereby dislodging or disintegrating at least a portion of filtered material from the wire mesh.

In another embodiment, a self-cleaning filter apparatus is disclosed. The apparatus comprises a chamber having one inlet and two outlets. The inlet is configured to allow unfiltered liquid into the chamber of the apparatus. One outlet is configured to allow filtered liquid to exit the chamber while the other outlet is configured to allow filtered particles to exit the chamber. To filter the liquid, the apparatus may utilize various filtering mechanisms. In the present example, the apparatus has a filter mesh constructed from metal or ceramic. The filter mesh is configured to trap at least a portion of the particles to be filtered out of the unfiltered liquid. The apparatus also has one or more electrodes placed in the chamber. When an appropriate potential is applied to an electrode, a plasma discharge is created. The plasma discharge induces an electric pulse that vaporizes a portion of the liquid surrounding the electrode. The shockwave travels to the filter mesh and dislodges or disintegrates at least a portion of filtered particles, which in turn flow out of the particle outlet.

In a further embodiment, a self-cleaning filtration system is described. The system comprises a filter apparatus having a filter mesh for filtering particles from an unfiltered liquid stream and an electrode. The electrode is in electrical communication with a power supply that is configured to output an electrical potential. The electrical potential is suitable to cause a plasma discharge to occur around the electrode. The plasma discharge causes an electric pulse that dislodges or disintegrates particles filtered from the unfiltered liquid streams.

These and other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION OF ILLUSTRATIVE EMBODIMENTS

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

Figure 1:
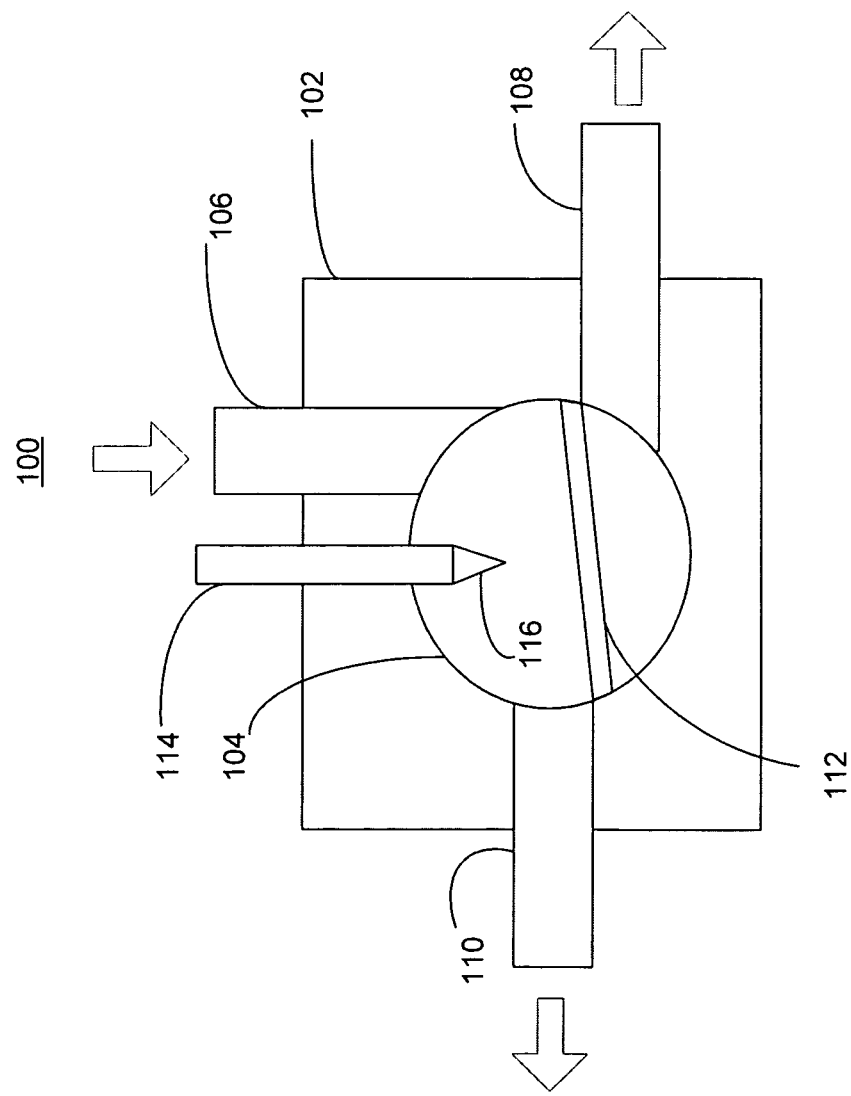
FIG. 1 is a schematic diagram of a self-cleaning filter using spark discharges in water, generated by an electrode located on the top of the filter surface.

The present invention is directed to novel self-cleaning filtration systems and a method to clean a filter surface using a liquid plasma discharge. A schematic diagram of an embodiment of the self-cleaning filtration system of the present invention is shown in FIG. 1. Filter apparatus 100 has outer casing 102 which is configured and shaped to create filter volume 104. A liquid to be filtered is introduced at inlet 106 into filter volume 104. The direction of flow of the liquid through inlet 106 and filter volume 104 may be changed to optimize the filtering of the liquid. For example, particulate removal may be optimized by introducing the unfiltered liquid at high tangential flow rates, which is highly effective at carrying away particulate matter and alleviating fouling on the surface of a filter 112.

In one example, during normal operation of the filtering system, at least 90% of the flow passes through the filter 112 and less than 10% of the flow is tangential, more preferably less than 5% of the flow is tangential. The self-cleaning filtration system using a liquid plasma discharge may be periodically implemented during the normal filtering process. The liquid plasma discharge filtration system may also be employed for designated maintenance or cleaning stages. During this cleaning stage, all or most of the flow through the filtration system may be tangential flow, having tangential flow rates of about 0.1-10 m/s, more preferably about 0.5-2 m/s. Such tangential flow is optional and typically does not need to be used but may prove desirable to supplement plasma discharge during the normal filter operations for certain difficult cleaning situations. The present invention may also be applied to a multi-stage filtration system to further enhance particulate removal, such as the one shown in FIG. 9, below.

Filtered particles exit filter volume 104 at outlet 110, and the filtered liquid exits filter volume 104 at outlet 108. Filter apparatus 100 also comprises filter 112 located near at least one electrode, shown is electrode 114, in filter volume 104. Electrode 114 is attached to a power source (not shown). During operation, contaminated liquid enters through inlet 106. Particles are filtered out of the liquid through the use of filter 112. When a suitable electric potential is applied to electrode 114, a plasma discharge is generated at or around electrode tip 116. The plasma discharge induces an electric pulse that vaporizes a portion of the liquid surrounding electrode tip 116, creating a shockwave. The shockwave travels to the filter 112 and dislodges or disintegrates at least a portion of filtered particles collected on filter 112. The dislodged particles in turn flow out through outlet 110. Filtered liquid continues to flow out of filter apparatus 100 through outlet 108.

The filter 112 may be constructed from any suitable filtration material. In one example, the material is selected from a metal such a stainless-steel, a carbon-containing material or a non-metallic medium such as a ceramic. For ceramic filters it is useful in some embodiments of the invention that such ceramic filters include a metallic coating on the surface of the filter exposed to the unfiltered liquid to enhance the performance of the cleaning system of the present invention. Filter 112 may also be configured to have any configuration, any desired number of pores and any desired pore size. In a preferred embodiment, the filter surface is configured to have a metal mesh structure.

Figure 2:
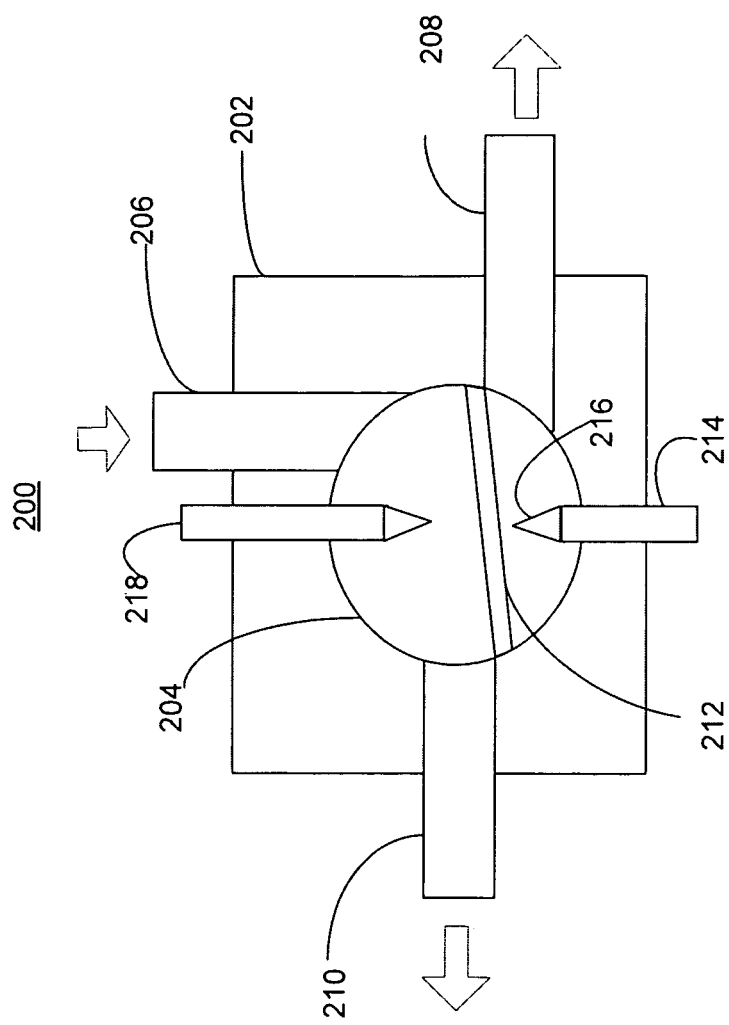
FIG. 2 is a schematic diagram of a self-cleaning filter using spark discharges in water, generated by an electrode located at the bottom of the filter surface.

Electrode 114 may be located on the side of the filter 112 exposed to the contaminated solution, as shown in FIG. 1, thereby enabling self-cleaning of the filter 112. The electrode may also be placed in an alternate location, as shown in FIG. 2. Constructed in a manner similar to filter apparatus 100 of FIG. 1, filter apparatus 200 of FIG. 2 has outer casing 202 which is configured and shaped to create filter volume 204. A liquid to be filtered is introduced at inlet 206 into filter volume 204. Filtered particles exit filter volume 204 at outlet 210, and the filtered liquid exits filter volume 204 at outlet 208. Filter apparatus 200 also comprises filter 212 located near at least one electrode, shown is electrode 214, in filter volume 204. Electrode 214 is attached to a power source (not shown).

During operation, contaminated liquid enters through inlet 206. Particles are filtered out of the liquid through the use of filter 212. When a suitable electric potential is applied to electrode 214, a plasma discharge is generated at or around electrode tip 216. The plasma discharge induces an electric pulse that vaporizes a portion of the liquid surrounding electrode tip 216, creating a shockwave. The shockwave travels to the filter 212 and dislodges or disintegrates at least a portion of filtered particles collected on filter 212. The dislodged particles in turn flow out through outlet 210. Filtered liquid continues to flow out of filter apparatus 200 through outlet 208. In another example, filter apparatus 200 may have additional or multiple electrodes. For example, filter apparatus 200 also has electrode 218. Electrode 218 and electrode 216 may be used separately or together to clean filter 212.

Figure 3:
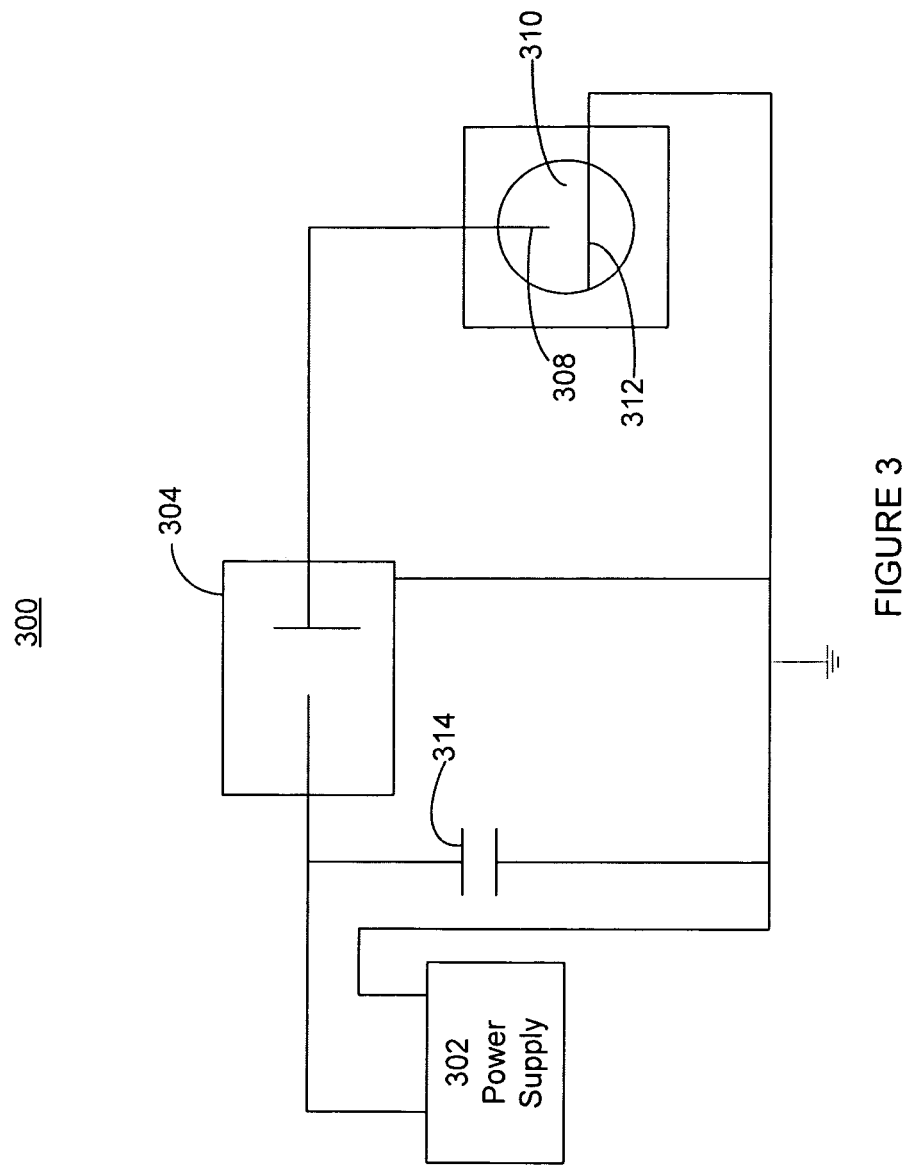
FIG. 3 is a circuit diagram of an embodiment of a plasma filtration system.

FIG. 3 shows a circuit diagram of an embodiment of a self-cleaning filtration system. In the circuit, spark gap 304 functions as a fast high current switch. When the circuit is complete, an arc discharge is initiated by the over-voltage, generated by the power supply 302 and capacitor 314. Power supply 302 may be any power source capable of producing a plasma discharge in liquid 310. Preferably, power supply 302 is a nano-pulse power source capable of producing short electric pulses of nanoseconds in duration at high voltages.

By altering the distance between the two electrodes in spark gap 304, the power transferred from power supply 302 may be used to produce in liquid 310 one of two different types of plasma in the filter system: corona discharge plasma; and spark discharge plasma. Either the corona discharge plasma or, the more powerful, spark discharge plasma, generated by electrode 308 may be used to produce electrical charges in the liquid. These short electric pulses have a duration of about 1-500 nanoseconds, preferably about 10-200 nanoseconds and more preferably about 50-150 nanoseconds. They are generated at high voltages of about 10-40 kV, more preferably 30-40 kV, the voltage being sufficient to generate the desired plasma discharge. The associated frequencies can range from about 0.1-500 Hz, more preferably about 1-100 Hz. In one preferred embodiment, the electric pulses have a voltage of about 30 kV and a corresponding frequency range of about 1 Hz to about 38 Hz.

The electrical pulses rapidly vaporize the solution surrounding electrode 308 and generate strong shockwaves. These shockwaves disintegrate and dislodge metal salt particles, such as calcium carbonate particles, located on the surface of the filter 312 and push them away from the filter surface and eventually out of the filter system, thereby cleaning filter 312.

Figure 4:
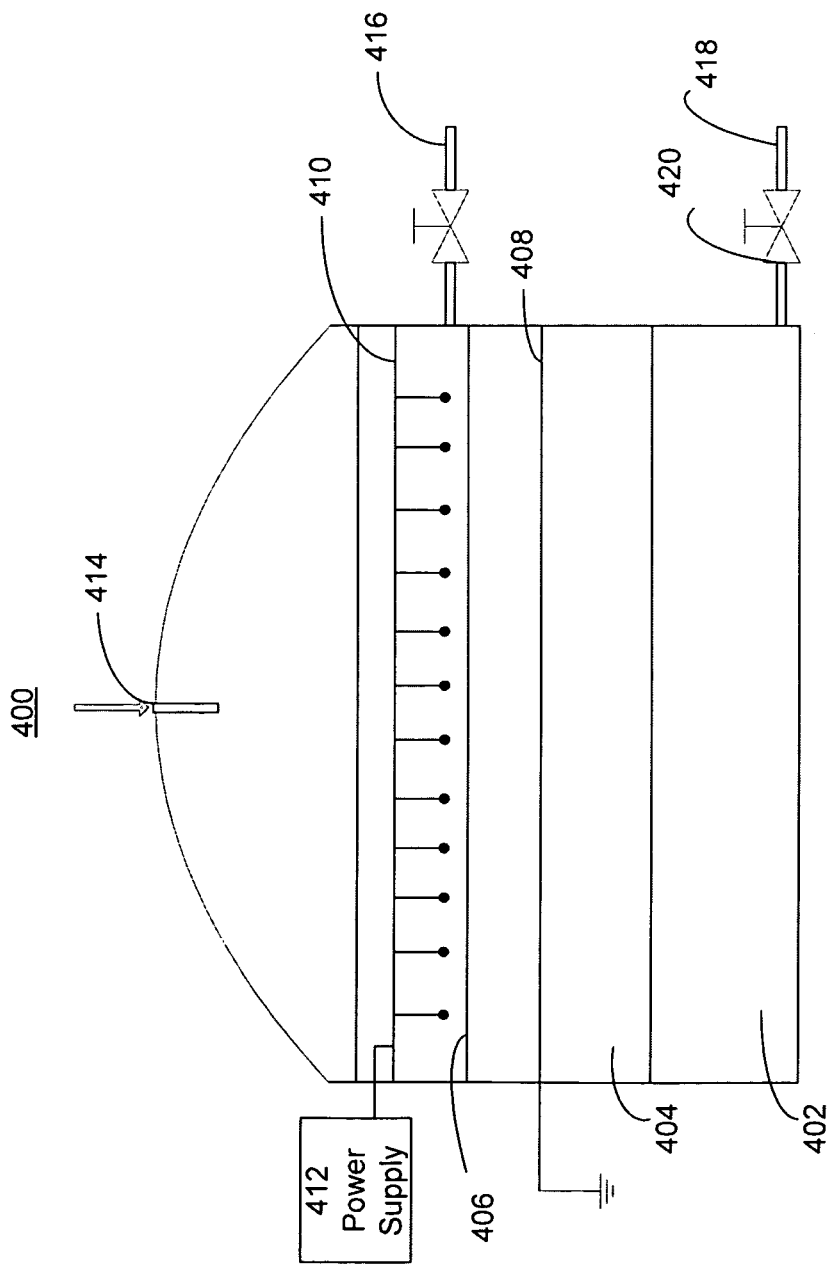
FIG. 4 is a diagram of a self-cleaning "Sand Filtration Type A" system.

The use of a plasma discharge to clean a filter may be used in various ways. In one application, the self-cleaning filter of the present invention may be incorporated into sand filter system 400 as shown in FIG. 4. Sand filter system 400 has a layer of sand 404 and layer of gravel 402, which are commonly used in cooling towers. The layer of sand 404 has top layer 406. During operation, contaminated liquid enters sand filter system 400 through inlet 414 and exits, as filtered liquid, through outlet 418.

In one example of cleaning, outlet valve 420 is throttled to a point allowing the untreated water to accumulate at the sand filter, such that the water level is about one half inch above the top layer 406 of sand 404. When the proper water level necessary to enable a plasma discharge is obtained, electrodes 410 are energized with a suitable electrical potential from power supply 412, causing suitable plasma discharges, such as pulsed spark discharges, to be initiated. Ground may be provided by grounding a circular filter mesh 408. Filter mesh 408 may be constructed from stainless steel. In the present example, filter mesh 408 is positioned above the top sand layer may function as one electrode connected to the ground. The discharges vaporize a portion of water surround electrodes 410, causing a shockwave that is used to dislodge any deposits on the top layer 406 of sand 404. A continuous forward flow of untreated water continues to enter the filtration system at inlet 414 and carries away deposited particles through outlet 416, located just above the top layer, thus removing dislodged deposits from the sand filter. The filtered or treated water exits the system at outlet 418.

Figure 5:
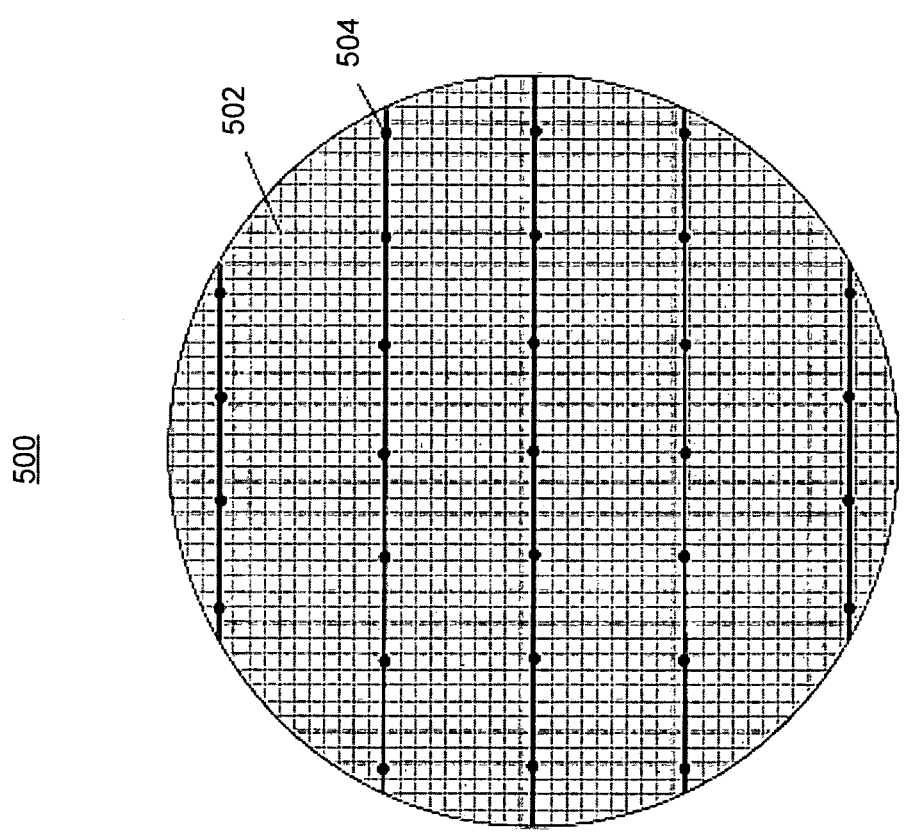
FIG. 5 is a diagram of the filter of the self-cleaning "Sand Filtration Type A" system of FIG. 4.

FIG. 5 is a top view illustration of one example of a filter mesh that may be used in conjunction with sand filter system 400. Filter mesh 500 may be constructed of various materials, as discussed above. Filter mesh 500 may have a matrix of cross-linking metal strands, shown generally as 502, with interdispersed electrodes, shown as electrodes 504. Electrodes 504 are short-length metal wires attached to and in electrical communication with metal strands 502. The tip of the metal wires act in a manner similar to electrode tip 116 of electrode 114 in FIG. 1.

Figure 6:
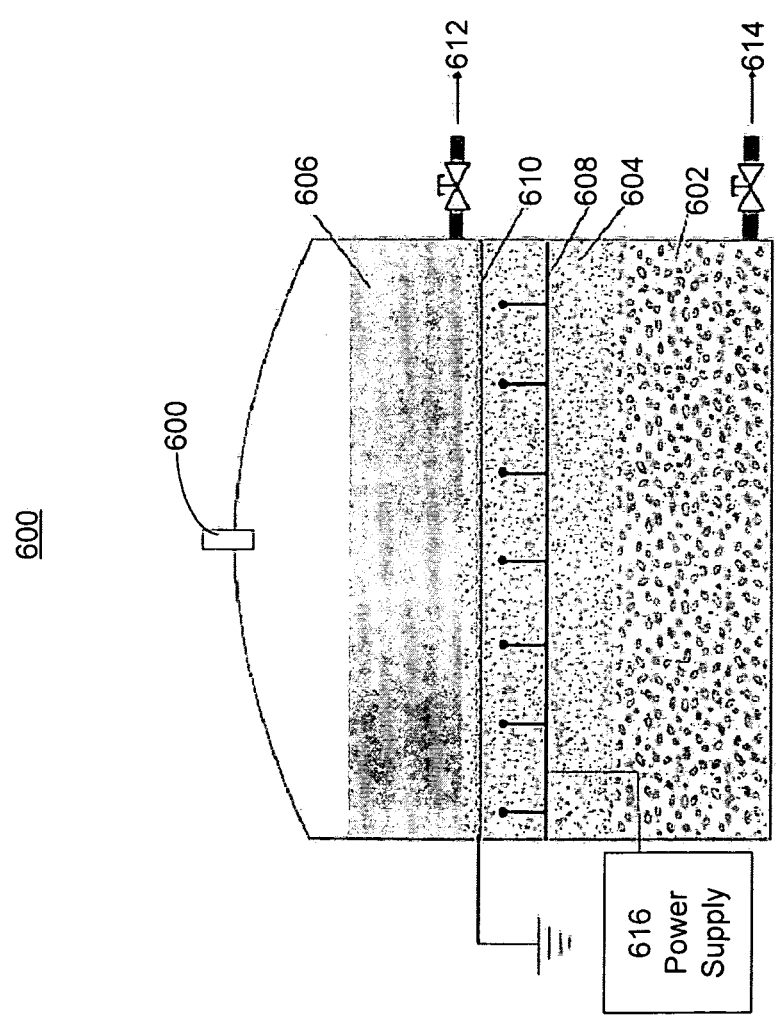
FIG. 6 is a diagram of a self-cleaning "Sand Filtration Type B" system.

FIG. 6 is an example of sand filtration system 600 wherein multiple electrodes are positioned below the top layer of sand to cover the circular cross-sectional area of the filter. A circular metal mesh 610, which in this example is constructed from stainless steel, is positioned below the top of sand layer 604 and is grounded, acting as one electrode. A series of short-length metal wire electrodes 608, in this example constructed from stainless steel, are positioned below metal mesh 610 and act as a second electrode.

When a suitable potential from power supply 616 is applied to metal wire electrodes 608, a plasma discharge is generated which vaporizes a portion of water surround wire electrodes 608, causing a shockwave that is used to dislodge any deposits on the top layer of sand 604. A continuous forward flow of untreated water continues to enter the filtration system at inlet 600 and carries away deposited particles through outlet 612, located just above the top layer of sand 604, thus removing dislodged deposits from the sand filter. The filtered or treated water exits the system at outlet 614. More than one power supply 616 may be used to power different sets of wire electrodes 608.

Figure 7:
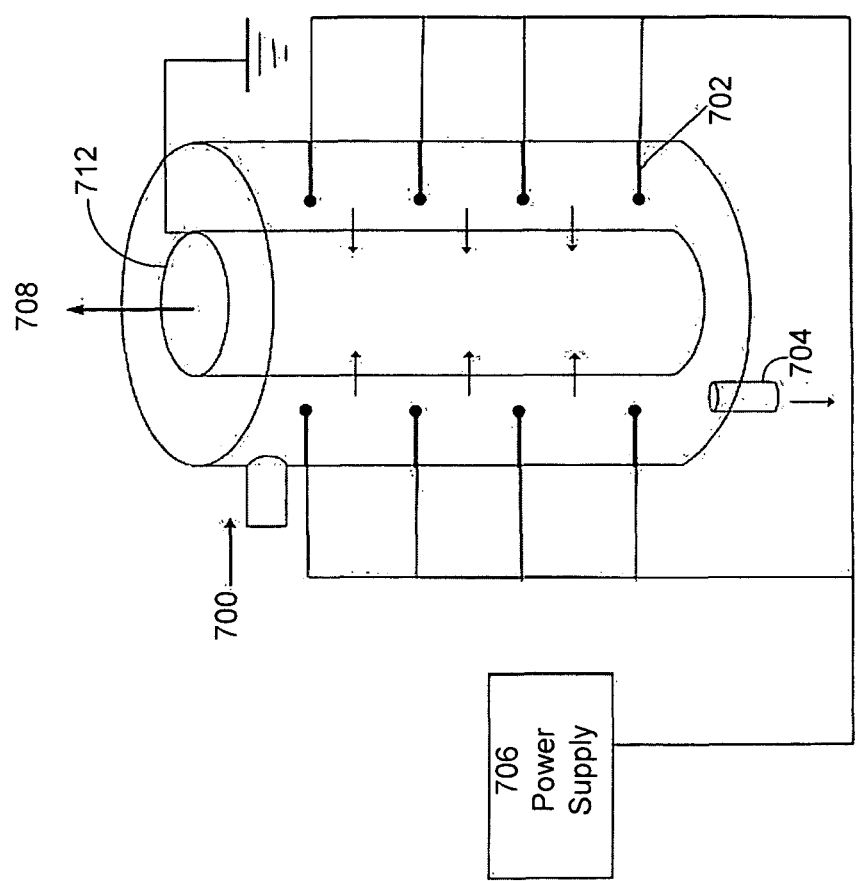
FIG. 7 is a diagram of a self-cleaning filtration system using a "Cartridge Type Filter A".

FIG. 7 shows an example of the use of the present subject matter in a cartridge filter, termed cartridge type filter A. Multiple metal electrodes 702, which are preferably made from stainless steel, are positioned outside a filter cartridge 712 so as to be exposed to untreated liquid entering from inlet 700. The filter cartridge 712 is made of metal and connected to ground. Periodically, pulsed spark discharges, generated by a power supply 706, are applied to dislodge deposits that collect on the outer surface (the surface exposed to metal electrodes 702) of filter cartridge 712. The dislodged deposits move from the surface of the filter that was exposed to the unfiltered, and due to the effects of gravity, fall to the bottom and leave the filter system through the outlet 704. Filtered liquid exits the water treatment filter through outlet 708.

Figure 8:
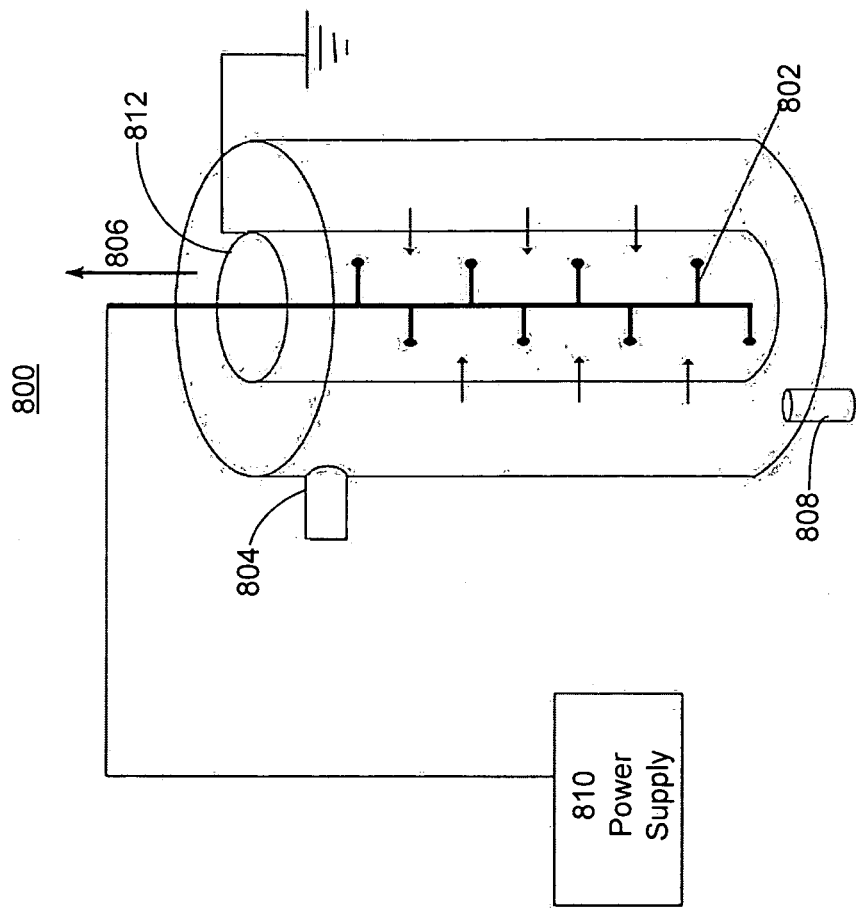
FIG. 8 is a diagram of a self-cleaning filtration system using a "Cartridge Type Filter B".

FIG. 8 shows an alternate example of the use of the present subject matter in a cartridge filter, termed cartridge type filter B. Multiple electrodes 802, which are preferably made from stainless steel, are positioned inside filter cartridge 812, thus exposing electrodes 802 to filtered liquid exiting the filter through outlet 806. The filter cartridge 812 is made of metal and connected to ground. Periodically, pulsed spark discharges, generated by power supply 810, are applied to dislodge deposits that collect on the outer surface (the surface not exposed to metal electrodes 802) of filter cartridge 812. The dislodged deposits move from the surface of the filter that was exposed to the unfiltered, and due to the effects of gravity, fall to the bottom and leave the filter system through the outlet 808.

Figure 9:
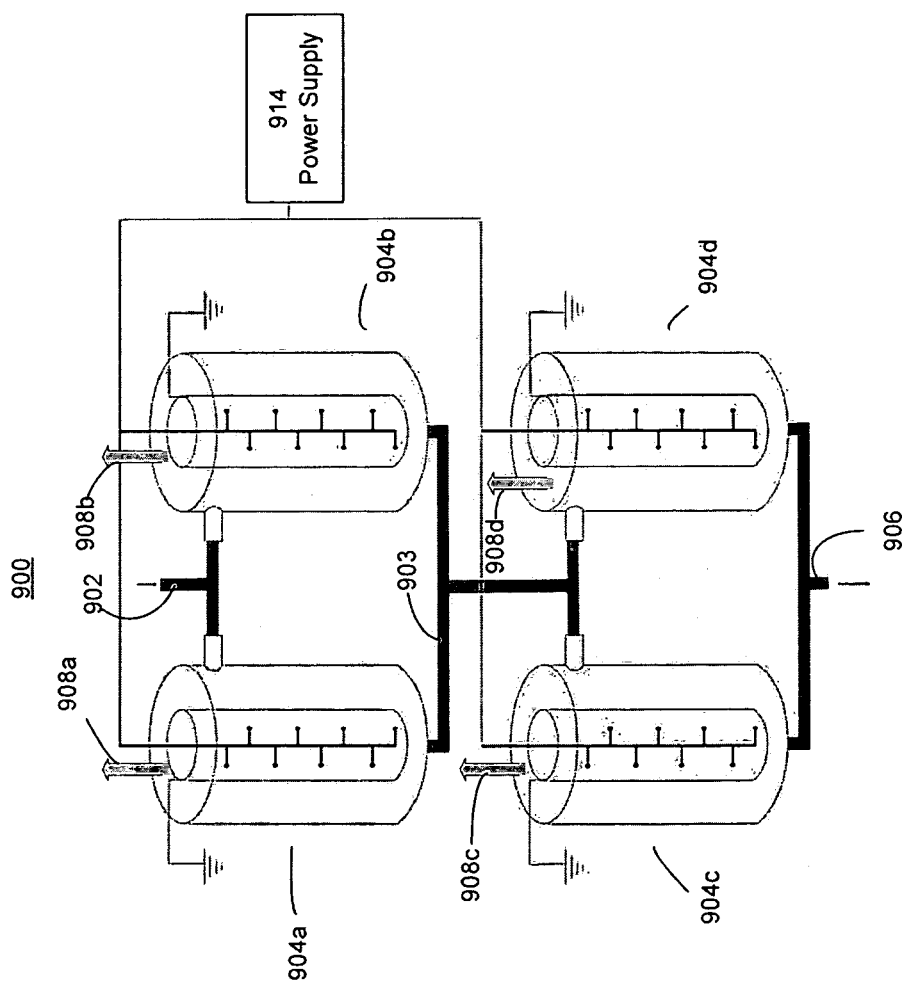
FIG. 9 is a diagram of a two stage filtration system.

FIG. 9 shows an example of a liquid treatment filter system 900 that incorporates a two stage filtration process. In the present example, filters 904a-d are constructed in a manner similar to the filter of FIG. 8 in which the electrodes are positioned inside a cartridge filter. Untreated liquid enters filters 904a and 904b through inlet 902. The liquid is filtered in a manner similar to that described in FIG. 8. Filtered water exits through outlets 908a and 908b of filters 904a and 904b. A portion of the untreated liquid travels through outlet 903 and is filtered in filters 904c and 904d. Filtered liquid exists through outlets 908b and 908d of filters 904c and 904d. To clean the filter cartridges of filters 904a-d, periodically, pulsed spark discharges, generated by power supply 914, are applied to electrodes in filters 904a-d to dislodge deposits that collect on the outer surface (the surface not exposed to the metal electrodes) of the filter cartridges of filters 904a-d. The dislodged deposits move from the surface of the filter that was exposed to the unfiltered, and due to the effects of gravity, fall to the bottom and leave the filter system through the outlets 903 and 906.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A method of cleaning a filter having filtered particulate thereon, said filter positioned within a liquid, said method comprising:

applying an electric potential to a first electrode positioned within the liquid, so as to generate a pulsed plasma discharge said pulsed plasma discharge creating an electrical pulse vaporizing at least a portion of the liquid to cause a shockwave within the liquid, wherein the shockwave travels to the filter to impart a force upon the filter;

said force disintegrating or dislodging the filtered particulate.

2. The method of claim 1, wherein the electrical potential is applied for a duration of 1 to 500 nanoseconds.

3. The method of claim 2, wherein the electrical potential is applied for a duration of 10 to 200 nanoseconds.

4. The method of claim 3, wherein the electrical potential is applied for a duration of 50 to 150 nanoseconds.

5. The method of claim 1, wherein the electrical potential is within a voltage range of about 10 kV to 40 kV.

6. The method of claim 5, wherein the electrical potential is within a voltage range of about 30 kV to 40 kV.

7. The method of claim 1, wherein a frequency of the electrical potential is in the range of approximately 0.1 Hz to 500 Hz.

8. The method of claim 7, wherein the frequency of the electrical potential is in the range of approximately 1 Hz to 100 Hz.

9. The method of claim 1, wherein the electrode is stainless steel.

10. The method of claim 1, wherein the electrical potential is applied to a plurality of second electrodes.

11. The method of claim 1, wherein the filter is a metal, a carbon-containing material, or a non-metallic medium.

12. The method of claim 11, wherein the filter is stainless steel.

13. The method of claim 11, wherein the filter comprise a ceramic.

14. The method of claim 13, wherein the filter further comprises a metallic coating.

15. A self-cleaning filter apparatus comprising:

a chamber containing liquid, said chamber having a defined volume;

a liquid inlet for inletting unfiltered liquid into the chamber, wherein the unfiltered liquid comprises particulate;

a filter mesh for filtering at least a portion of the particulate in the unfiltered liquid to convert the unfiltered liquid into filtered liquid; and a first electrode positioned in the volume within the liquid, located proximate to the filter mesh;

said electrode in electrical communication with a power supply, wherein the power supply is configured to cause a suitable electrical potential to form a pulsed plasma discharge at the electrode, thereby vaporizing at least a portion of the liquid, causing a shockwave within the liquid, wherein the shockwave travels to the filter to impart a force upon the filter; said force disintegrating or dislodging the filtered particulate.

16. The apparatus of claim 15, wherein the plasma discharge is a corona discharge plasma or a spark discharge plasma.

17. The apparatus of claim 16, wherein the plasma discharge is controlled by the distance between two electrodes in a spark gap, wherein the spark gap is configured to act as a fast high current switch.

18. The apparatus of claim 15, wherein the chamber is a cartridge filter.

19. The apparatus of claim 15, wherein the chamber is a sand filtration system.

20. The apparatus of claim 15, further comprising a first outlet for the filtered liquid and a second outlet for the particulate.

21. A system, comprising:

a first filter chamber containing liquid, said chamber having a defined volume;

a first filter positioned within the liquid of the first filter chamber;

at least one first electrode positioned within the liquid of the first filter chamber at a location proximate to the first filter; and a power supply in electrical communication with the at least one first electrode, wherein the power supply is configured to provide an electrical potential to the at least one first electrode sufficient to generate pulsed plasma discharge, the plasma discharge being sufficient to create an electrical pulse from the plasma discharge within the liquid which vaporizes at least a portion of the liquid to cause a shockwave within the liquid, wherein the shockwave travels to the first filter to impart a force upon the at least one first filter and disintegrate or dislodge a filtered particulate on the first filter.

22. The system of claim 21, wherein the filter chamber comprises an inlet to allow unfiltered liquid into the defined volume, a first outlet to allow at least filtered liquid to exit the defined volume, and a second outlet to allow at least the filtered particulate to exit the defined volume.

23. The system of claim 21, wherein the chamber is a cartridge filter.

24. The system of claim 21, wherein the chamber is a sand filtration system.

25. The system of claim 21, further comprising:

a second filter chamber containing liquid, said chamber having a second defined volume;

a second filter positioned within the liquid of the second filter chamber; and at least one second electrode positioned within the liquid of the second filter chamber at a location proximate to the second filter, wherein the power supply is in electrical communication with the second electrode.

* * * * *